United States Patent
Wasylenko et al.

(10) Patent No.: US 11,401,392 B2
(45) Date of Patent: Aug. 2, 2022

(54) BARRIER FILM COMPOSITION

(71) Applicant: NOVA Chemicals (International) S.A., Fribourg (CH)

(72) Inventors: Derek Wasylenko, Calgary (CA); Owen Lightbody, Calgary (CA); Tony Tikuisis, Calgary (CA); P. Scott Chisholm, Calgary (CA)

(73) Assignee: NOVA CHEMICALS (INTERNATIONAL) S.A., Fribourg (CH)

( * ) Notice: Subject to any disclaimer, the term of this patent is extended or adjusted under 35 U.S.C. 154(b) by 215 days.

(21) Appl. No.: 16/682,015

(22) Filed: Nov. 13, 2019

(65) Prior Publication Data
US 2020/0157296 A1 May 21, 2020

(30) Foreign Application Priority Data
Nov. 16, 2018 (CA) .................. CA 3024241

(51) Int. Cl.
*C08J 5/18* (2006.01)
*B65D 65/38* (2006.01)
*B65D 81/24* (2006.01)

(52) U.S. Cl.
CPC ............... *C08J 5/18* (2013.01); *B65D 65/38* (2013.01); *B65D 81/24* (2013.01); *C08J 2323/06* (2013.01); *C08J 2423/06* (2013.01)

(58) Field of Classification Search
CPC ........................................................ C08J 5/18
See application file for complete search history.

(56) References Cited

U.S. PATENT DOCUMENTS

| | | | |
|---|---|---|---|
| 6,777,520 B2 | 8/2004 | McLeod et al. | |
| 7,491,762 B2 | 2/2009 | Wolters et al. | |
| 2006/0047078 A1 | 3/2006 | Swabey et al. | |
| 2008/0118749 A1* | 5/2008 | Aubee | B29C 55/28 428/340 |
| 2015/0132593 A1* | 5/2015 | Borse | B32B 27/18 428/516 |

OTHER PUBLICATIONS

ASTM F 1249-90 (Reapproved 1995)—Standard Test Method for Water Vapor Transmission Rate Through Plastic Film and Sheeting Using a Modulated Infrared Sensor; Copyright ASTM International, Current edition approved Jul. 27, 1990. Published Sep. 1990. Originally published as F 1249-89. Last previous edition F1249-89. pp. 1-5.
ASTM D6474-99 (Reapproved 2006)—Standard Test Method for Determining Molecular Weight Distribution and Molecular Weight Averages of Polyolefins by High Temperature Gel Permeation Chromatography. Copyright ASTM International. Current edition approved Mar. 15, 2006. Published Apr. 2006. Originally approved in 1999. Last previous edition approved in 1999 as D6474-99. pp. 1-6.
ASTM D1238-13—Standard Test Method for Melt Flow Rates of Thermoplastics by Extrusion Plastometer. Copyright ASTM International. Current edition approved Aug. 1, 2013. Published Aug. 2013. Originally approved in 1965. Last previous edition approved in 2010 as D1238-10. pp. 1-16.
ASTM D1505-18—Standard Test Method for Density of Plastics by the Density-Gradient Technique. Copyright ASTM International. Current edition approved Apr. 1, 2018. Published Apr. 2018. Originally approved in 1957. Last previous edition approved in 2010 as D1505-10. pp. 1-7.

* cited by examiner

*Primary Examiner* — Michael F Pepitone
(74) *Attorney, Agent, or Firm* — Thomas J. Styslinger

(57) ABSTRACT

Barrier films are prepared from a composition comprising 1) a blend of two high density polyethylene HDPE blend components, 2) zinc glycerolate and 3) a dispersion aid/synergist. The two high density polyethylene blend components have substantially different melt indices. It is difficult to properly mix the zinc glycerolate into this HDPE blend. The use of the dispersion aid/synergist improves the water vapor transmission rate (WVTR) of polyethylene film (in comparison to barrier films made with zinc glycerolate, in the absence of the dispersion aid/synergist). The resulting barrier films are suitable for the preparation of packaging for dry foods such as crackers and breakfast cereals.

12 Claims, No Drawings

BARRIER FILM COMPOSITION

CROSS-REFERENCE TO RELATED PATENT APPLICATIONS

This U.S. Patent Application the benefit of priority under 35 U.S.C. § 119 to Canadian Application No. 3024241, filed Nov. 16, 2018, and which is incorporated herein by reference in its entirety.

DETAILED DESCRIPTION

This disclosure relates to barrier films which are prepared from a blend of at least two high density polyethylene (hdpe) resins, zinc glycerolate and a dispersion aid/synergist. The films may be used to prepare packaging for dry foods such as crackers and breakfast cereals.

Polyethylene may be classified into two broad families, namely "random" (which is commercially prepared by initiation with free radicals under polymerization conditions that are characterized by the use of very high ethylene pressures) and "linear" (which is commercially prepared with a transition metal catalyst, such as a "Ziegler Natta" catalyst, or a "chromium" catalyst, or a single site catalyst or a "metallocene catalyst").

Most "random" polyethylene which is commercially sold is a homopolymer polyethylene. This type of polyethylene is also known as "high pressure low density polyethylene" because the random polymer structure produces a lower polymer density. In contrast, most "linear" polyethylene which is commercially sold is copolymer of ethylene with at least one alpha olefin (for example, butene, hexene or octene). The incorporation of a comonomer into linear polyethylene reduces the density of the resulting copolymer. For example, a linear ethylene homopolymer generally has a very high density (for example, greater than 0.955 grams per cubic centimeter (g/cc))—but the incorporation of small amounts of comonomer results in the production of so-called "high density polyethylene" (or "hdpe"—for example, having densities greater than 0.935 g/cc) and the incorporation of further comonomer produces so-called "linear low density polyethylene" (or "lldpe"—for example, having a density of from about 0.905 g/cc to 0.935 g/cc).

Some plastic film is made from hdpe. One particular type of hdpe film is used to prepare food packaging with "barrier properties"—i.e. the film acts as a "barrier" to water vapor transmission. This so-called "barrier film" is used to prepare packages (or liners for cardboard packages) for breakfast cereals, crackers and other dry foodstuffs.

It has recently been discovered that the barrier properties of hdpe film may be improved by the addition of a nucleating agent.

We have now discovered that HDPE films with excellent barrier properties may be produced using 1) a blend of two hdpe resins which have substantially a different melt index from each other; 2) zinc glycerolate and 3) a dispersion aid/synergist.

In an embodiment, the present disclosure provides:
I) zinc glycerolate;
II) a high density polyethylene blend composition including:
  II-i) from 5 to 60 weight % of at least one high density polyethylene blend component a) having a high melt index, $I_2$; and
  II-ii) from 95 to 40 weight % of at least one high density polyethylene blend component b) having a low melt index, $I_2'$, wherein:
    a) said organic barrier nucleating agent is added in an amount of from 100 to 3000 parts per million based on the weight of said high density blend composition;
    b) each of said blend component a) and blend component b) has a density of from 0.950 to 0.975 g/cc;
    c) the melt index, $I_2$, of said blend composition is from 0.5 to 10 grams/10 minutes; and
    d) the $I_2$ ratio, obtained by dividing the $I_2$ value of said blend component a) by the $I_2'$ value of said blend component b) is greater than 10/1; and
III) a synergist.

In an embodiment, the dispersion aid includes a calcium or zinc salt of a fatty acid (e.g. calcium or zinc stearate) or a mixture of these salts. In another embodiment, the disclosure provides a process to prepare a barrier film for food packaging, said process including the film extrusion of a composition including:
I) zinc glycerolate;
II) a high density polyethylene blend composition including:
  II-i) from 5 to 60 weight % of at least one high density polyethylene blend component a) having a high melt index, $I_2$; and
  II-ii) from 95 to 40 weight % of at least one high density polyethylene blend component b) having a low melt index, $I_2'$, wherein:
    a) said zinc glycerolate is added in an amount of from 100 to 3000 parts per million based on the weight of said high density polyethylene blend composition;
    b) each of said blend component a) and blend component b) has a density of from 0.950 to 0.975 g/cc;
    c) the melt index, $I_2$, of said high density polyethylene blend composition is from 0.5 to 10 grams/10 minutes; and
    d) the $I_2$ ratio, obtained by dividing the $I_2$ value of said blend component a) by the $I_2'$ value of said blend component b) is greater than 10/1; and
III) a synergist, wherein said synergist includes at least one fatty acid salt of a metal chosen from calcium and zinc.

In another embodiment, the WVTR of the film made by this process is from 15 to 40% lower than the WVTR of a control film that is prepared in the absence of the synergist.

Barrier Film and Food Packaging

Plastic films are widely used as packaging materials for foods. Flexible films, including multilayer films, are used to prepare bags, wrappers, pouches and other thermoformed materials.

The permeability of these plastic films to gases (for example, oxygen) and moisture is an important consideration during the design of a suitable food package.

Films prepared from thermoplastic ethylene-vinyl alcohol ("EVOH") copolymers are commonly employed as an oxygen barrier and/or for resistance to oils. However, EVOH films are quite permeable to moisture.

Conversely, polyolefins, for example high density polyethylene, are resistant to moisture transmission but comparatively permeable to oxygen.

The permeability of linear polyethylene film to moisture is typically described by a "water vapor transmission rate" (or "WVTR"). In certain applications some vapor transmission is desirable—for example, to allow moisture out of a package which contains produce. The use of linear low density polyethylene (lldpe) which may be filled with calcium carbonate (to further increase vapor transmission) is common for this purpose.

Conversely, for packages which contain crispy foods such as breakfast cereals or crackers, it is desirable to limit WVTR to very low levels to prevent the food from going stale. The use of hdpe to prepare "barrier film" is common for this purpose. A review of plastic films and WVTR behavior is provided in U.S. Pat. No. 6,777,520 (McLeod et al.)

This disclosure relates to "barrier films" prepared from hdpe—i.e. films with low WVTR. As will be appreciated from the above description of EVOH films, it is also known to prepare multilayer barrier films to produce a structure which is resistant to moisture and oxygen. Multilayer structures may also contain additional layers to enhance packaging quality—for example, additional layers may be included to provide impact resistance or sealability. It will also be appreciated by those skilled in the art that "tie layers" may be used to improve the adhesion between "structural" layers. In such multilayer structures, the hdpe barrier layer may either be used as an internal ("core") layer or external ("skin") layer.

The manufacture of "barrier" food packaging from plastic resins involves two basic operations.

The first operation involves the manufacture of plastic film from the plastic resin. Most "barrier films" are prepared by "blown film" extrusion, in which the plastic is melted in an extruder, then forced through an annular die. The extrudate from the annular die is subjected to blown air, thus forming a plastic bubble. The use of multiple extruders and concentric dies permits multilayer structures to be co-extruded by the blown film process. The "product" from this operation is "barrier film" which is collected on rolls and shipped to the manufacturers of food packaging.

The manufacturer of the food packaging generally converts the rolls of blown film into packaged foods. This typically involves three basic steps:

1) forming the package;
2) filling the package;
3) sealing the food in the finished package.

Although the specific details will vary from manufacturer to manufacturer, it will be readily appreciated that the film needs to have a balance of physical properties in order to be suitable for food packaging. In addition to low WVTR, it is desirable for the film to "seal" well and to have sufficient impact strength and stiffness (or film "modulus") to allow easy handling of the package. Multilayer coextrusions are often used to achieve this balance of properties, with 3 and 5 layer coextrusions being well known. Sealant layers may be prepared with ethylene-vinyl acetate (EVA) ionomers (such as those sold under the trademark SURLYN™ by E.I. DuPont), very low density polyethylene (polyethylene copolymers having a density of less than 0.910 grams per cubic centimeter) and blends with small amounts of polybutene. It is known to use sealant compositions in both "skin" layers of a coextrusion or in only one of the skin layers.

HDPE Blend Components and Overall Composition

The plastic used in the barrier film of this disclosure is high density polyethylene (hdpe). Specifically, the hdpe must have a density of at least 0.950 grams per cubic centimeter ("g/cc") as determined by ASTM D 1505. Exemplary, hdpe has a density of greater than 0.955 g/cc and in some embodiments the hdpe is a homopolymer of ethylene.

Blend Components

Blend Component a)

Blend component a) of the polyethylene composition used in this disclosure includes an hdpe with a comparatively high melt index. As used herein, the term "melt index" is meant to refer to the value obtained by ASTM D 1238 (when conducted at 190° C., using a 2.16 kg weight). This term is also referenced to herein as "$I_2$" (expressed in grams of polyethylene which flow during the 10 minute testing period, or "gram/10 minutes"). As will be recognized by those skilled in the art, melt index, $I_2$, is in general inversely proportional to molecular weight. Thus, blend component a) of this disclosure has a comparatively high melt index (or, alternatively stated, a comparatively low molecular weight) in comparison to blend component b).

The absolute value of $I_2$ for blend component a) is, for example, greater than 5 grams/10 minutes. However, the "relative value" of $I_2$ for blend component a) is critical—it must be at least 10 times higher than the $I_2$ value for blend component b) [which $I_2$ value for blend component b) is referred to herein as $I_2$']. Thus, for the purpose of illustration: if the $I_2$' value of blend component b) is 1 gram/10 minutes, then the $I_2$ value of blend component a) must be at least 10 grams/10 minutes.

Blend component a) is further characterized by:
  i) density—it must have a density of from 0.950 to 0.975 g/cc; and
  ii) weight % of the overall polyethylene composition—is present in an amount of from 5 to 60 weight % of the total hdpe composition (with blend component b) forming the balance of the total polyethylene) with amounts of from 10 to 40 weight %, or from 20 to 40 weight %, as another example. It is permissible to use more than one high density polyethylene to form blend component a).

The molecular weight distribution [which is determined by dividing the weight average molecular weight (Mw) by number average molecular weight (Mn) where Mw and Mn are determined by gel permeation chromatography, according to ASTM D 6474-99] of component a) is, for example, from 2 to 20, or from 2 to 4. While not wishing to be bound by theory, it is believed that a low Mw/Mn value (from 2 to 4) for component a) may improve the nucleation rate and overall barrier performance of blown films prepared according to the process of this disclosure.

Blend Component b)

Blend component b) is also a high density polyethylene which has a density of from 0.950 to 0.970 g/cc (for example, from 0.955 to 0.965 g/cc).

The melt index of blend component b) is also determined by ASTM D 1238 at 190° C. using a 2.16 kg load. The melt index value for blend component b) (referred to herein as $I_2$') is lower than that of blend component a), indicating that blend component b) has a comparatively higher molecular weight. The absolute value of $I_2$' is, for example, from 0.1 to 2 grams/10 minutes.

In one embodiment, the molecular weight distribution (Mw/Mn) of component b) is not critical, though a Mw/Mn of from 2 to 4 is preferred for component b).

As noted above, the ratio of the melt index of component b) divided by the melt index of component a) must be greater than 10/1.

Blend component b) may also contain more than one hdpe resin. For example, Blend component b may contain a small amount (less than 5, for example, less than 3 weight %, based on the overall HDPE composition) of HDPE having a molecular weight, Mw, of from 250,000 to 2,000,000.

Overall HDPE Composition

The overall high density blend composition used in this disclosure is formed by blending together blend component a) with blend component b). This overall hdpe composition must have a melt index (ASTM D 1238, measured at 190° C. with a 2.16 kg load) of from 0.5 to 10 grams/10 minutes (for example, from 0.8 to 8 grams/10 minutes).

The blends may be made by any blending process, such as: 1) physical blending of particulate resin; 2) co-feed of different hdpe resins to a common extruder; 3) melt mixing (in any conventional polymer mixing apparatus); 4) solution blending; or, 5) a polymerization process which employs 2 or more reactors.

One example hdpe blend composition is prepared by melt blending the following two blend components in an extruder:

from 10 to 30 weight % of component a): where component a) is a conventional hdpe resin having a melt index, $I_2$, of from 15-30 grams/10 minutes and a density of from 0.950 to 0.960 g/cc with from 90 to 70 weight % of component b): where component b) is a conventional hdpe resin having a melt index, $I_2$, of from 0.8 to 2 grams/10 minutes and a density of from 0.955 to 0.965 g/cc.

An example of a commercially available hdpe resin which is suitable for component a) is sold under the trademark SCLAIR™ 79F, which is an hdpe resin that is prepared by the homopolymerization of ethylene with a conventional Ziegler Natta catalyst. It has a typical melt index of 18 grams/10 minutes and a typical density of 0.963 g/cc and a typical molecular weight distribution of about 2.7.

Examples of commercially available hdpe resins which are suitable for blend component b) include (with typical melt index and density values shown in brackets):

SCLAIR™19G (melt index=1.2 grams/10 minutes, density=0.962 g/cc);

MARFLEX™9659 (available from Chevron Phillips, melt index=1 grams/10 minutes, density=0.962 g/cc); and ALATHON™L 5885 (available from Equistar, melt index=0.9 grams/10 minutes, density=0.958 g/cc).

In one embodiment, the HDPE blend composition is prepared by a solution polymerization process using two reactors that operate under different polymerization conditions. This provides a uniform, in situ blend of the hdpe blend components. An example of this process is described in published U.S. patent application 20060047078 (Swabey et al.), the disclosure of which is incorporated herein by reference. The overall HDPE blend composition, for example, has a MWD (Mw/Mn) of from 3 to 20, or from 6 to $I_2$ and a Mw of from 10,000 to 40,000.

Zinc Glycerolate

Zinc glycerolate (CAS registry number 16754-68-0) is commercially available under the trademark IRGASTAB NA-287 from BASF. In an embodiment, it is used in amounts from 100 to 3000 ppm, or 200 to 2000 ppm, based on the total weight of the HDPE blend composition.

Dispersion Aid/Synergist

The HDPE blend composition of the present disclosure contains two blend components that have very different molecular weights (as evidenced by the requirement that the melt index, $I_2$, of one of the blend components is at least 10 times as high as the melt index of the other blend component).

We have observed that it is difficult to evenly disperse zinc glycerolate into this HDPE blend composition.

We have also observed that the use of calcium stearate or zinc stearate improves the WVTR of films made from the HDPE blend composition of this disclosure and zinc glycerolate (compared to "control films" made with the zinc glycerolate but without calcium or zinc stearate). This is a synergistic effect in the sense that we have not ever observed calcium or zinc stearate (on their own) to improve the WVTR of HDPE films. Without wishing to be bound by theory, we believe that the calcium and/or zinc stearate improve the dispersion of the zinc glycerolate. In an embodiment, the synergist improves/lowers the WVTR of film by 15 to 40% in comparison to a control film that is made without the synergist (but with the same HDPE blend composition and zinc glycerolate).

Composition of Calcium Stearate and Zinc Stearate

"Zinc stearate" and "calcium stearate" are commonly used terms that might imply that these products are "pure" or single molecules. However, as will be recognized by those skilled in the art, the fatty acids that are used to make these products (commercially) are commonly sourced from animal and/or vegetable materials that typically contain a mixture of various fatty acids, the majority of which contain, for example, from 16 to 18 carbon atoms.

Thus, for greater certainty, the terms "zinc stearate" and "calcium stearate" as used herein are not intended to be limited to single/pure molecules. Instead, these terms are intended to also describe the commercially available zinc stearate and calcium stearate products which are zinc salts (or calcium salts) of mixtures of fatty acids.

It is also within the scope of this disclosure to use a combination of zinc stearate and calcium stearate as the synergist.

Amount of Synergist

Our experiments indicate that there is an optimum level of synergist—i.e. either too much or too little has been observed to provide sub-optimal nucleation of the HDPE blend of this disclosure. While not wishing to be bound by theory, we believe that this provides further evidence of synergism (in the sense that "too much" stearate can produce a sub-optimal nucleation. Thus, in an embodiment, the amount of synergist is from 20 to 90, or from 30 to 70, weight % of the weight of the zinc glycerolate. Thus, for example, the use of 1000 parts per million by weight (ppm) of zinc glycerolate (based on the total weight of the HDPE composition) could be accompanied by from 200 to 900 (for example, 300 to 700) ppm of the metal stearate.

Masterbatch

In an embodiment, a "masterbatch" is prepared by melt mixing the HDPE composition, the zinc glycerolate and the synergist into a masterbatch that contains from 2 to 30 weight % of the zinc glycerolate; the (stearate) synergist in a weight ratio of from 1/3 to 1/1, based on the weight of the (stearate) synergist and the balance including the HDPE composition. This masterbatch provides a partially mixed, but still relatively "concentrated" form of the zinc glycerolate and synergist. The masterbatch is then melt mixed (for example, in an extruder) with further amounts of the HDPE composition in order to produce a finished HDPE barrier composition that contains from 100 to 2000 ppm of the zinc glycerolate.

The use of this type of masterbatch technique is generally known to those skilled in the art and is sometimes employed to improve the dispersion/mixing of additives in polymer compositions. For example, U.S. Pat. No. 7,491,762 (Wolters et al.) teaches the dispersion of a nucleating agent in polyethylene using a masterbatch which contains a polyolefin; a metal salt of hexahydrophthalic acid (nucleating agent); hydrophilic silica; hydrotalcite; and zinc stearate.

Other Additives

The hdpe may also contain other conventional additives, for example, (1) primary antioxidants (such as hindered phenols, including vitamin E); (2) secondary antioxidants (for example, phosphites and phosphonites); and (3) process aids (for example, fluoroelastomer and/or polyethylene glycol bound process aid).

Film Extrusion Process

Blown Film Process

The extrusion-blown film process is a well known process for the preparation of plastic film. The process employs an extruder which heats, melts and conveys the molten plastic and forces it through an annular die. Exemplary extrusion temperatures are from 330 to 500° F., or 350 to 460° F.

The polyethylene film is drawn from the die and formed into a tube shape and eventually passed through a pair of draw or nip rollers. Internal compressed air is then introduced from the mandrel causing the tube to increase in diameter forming a "bubble" of the desired size. Thus, the blown film is stretched in two directions, namely in the axial direction (by the use of forced air which "blows out" the diameter of the bubble) and in the lengthwise direction of the bubble (by the action of a winding element which pulls the bubble through the machinery). External air is also introduced around the bubble circumference to cool the melt as it exits the die. Film width is varied by introducing more or less internal air into the bubble thus increasing or decreasing the bubble size. Film thickness is controlled primarily by increasing or decreasing the speed of the draw roll or nip roll to control the draw-down rate.

The bubble is then collapsed into two doubled layers of film immediately after passing through the draw or nip rolls. The cooled film can then be processed further by cutting or sealing to produce a variety of consumer products. While not wishing to be bound by theory, it is generally believed by those skilled in the art of manufacturing blown films that the physical properties of the finished films are influenced by both the molecular structure of the polyethylene and by the processing conditions. For example, the processing conditions are thought to influence the degree of molecular orientation (in both the machine direction and the axial or cross direction).

A balance of "machine direction" ("MD") and "transverse direction" ("TD"-which is perpendicular to MD) molecular orientation is generally considered most desirable for key properties associated with the embodiments of this disclosure (for example, Dart Impact strength, Machine Direction and Transverse Direction tear properties).

Thus, it is recognized that these stretching forces on the "bubble" can affect the physical properties of the finished film. In particular, it is known that the "blow up ratio" (i.e. the ratio of the diameter of the blown bubble to the diameter of the annular die) can have a significant effect upon the dart impact strength and tear strength of the finished film.

The above description relates to the preparation of monolayer films. Multilayer films may be prepared by 1) a "co-extrusion" process that allows more than one stream of molten polymer to be introduced to an annular die resulting in a multi-layered film membrane or 2) a lamination process in which film layers are laminated together. The films of this disclosure are, in some embodiments, prepared using the above described blown film process.

An alternative process is the so-called cast film process, wherein the polyethylene is melted in an extruder, then forced through a linear slit die, thereby "casting" a thin flat film. The extrusion temperature for cast film is typically somewhat hotter than that used in the blown film process (with operating temperatures of from 450 to 550° F., for example). In general, cast film is cooled (quenched) more rapidly than blown film.

Further details are provided in the following examples.

EXAMPLES

The HDPE blend composition used in these examples was prepared in a dual reactor solution polymerization process in accordance with the disclosure of published U.S. patent application 20060047078 (Swabey et al.). The HDPE blend composition had a melt index, $I_2$, of 1.2 grams/10 minutes, a density of 0.967 g/cc and a molecular weight distribution, Mw/Mn, of 8.9. The HDPE blend composition had two distinct fractions which varied according to molecular weight. The low molecular weight fraction (or component a)) was about 55 weight % of the total composition and had a melt index, $I_2$, which was estimated to be greater than 5000 grams/10 minutes. The high molecular weight fraction was about 45 weight % of the total composition and had a melt index which was estimated to be less than 0.1 grams/10 minutes.

As noted above, melt index ($I_2$) is generally inversely proportional to molecular weight for polyethylene resins. This was confirmed for homopolymer hdpe resins having a narrow molecular weight distribution (of less than 3) by preparing a plot of log ($I_2$) versus log (weight average molecular weight, Mw). In order to prepare this plot, the melt index ($I_2$) and weight average molecular Mw) of more than 15 different homopolymer hdpe resins was measured. These homopolymer hdpe resins had a narrow molecular weight distribution (less than 3) but had different Mw— ranging from about 30,000 to 150,000. (As will be appreciated by those skilled in the art, it is difficult to obtain reproducible $I_2$ values for polyethylene resins having a molecular weight which is outside of this range).

A log/log plot of these $I_2$ and Mw values was used to calculate the following relation between $I_2$ and Mw for such homopolymer hdpe resins:

$$I_2 = (1.774 \times 10^{-19}) \times (Mw^{-3.86}).$$

Extrapolation (based on the above relation) was used to estimate the $I_2$ values of component a) and component b) of the HDPE resin. That is, the molecular weight of component a) and component b) was measured and the Mw values were used to estimate the $I_2$ values. It will be appreciated by those skilled in the art that it can be difficult to physically blend these hdpe blend components (due to the very different viscosities of these hdpe blend components). Accordingly, solution blending or an in-situ blending (i.e. prepared by a polymerization process) are exemplary methods to prepare such HDPE blend compositions.

Water Vapor Transmission Rate ("WVTR", expressed as grams of water vapor transmitted per 100 square inches of film per day at a specified film thickness (mils), or g/100 in²/day) was measured in accordance with ASTM F1249-90 with a MOCON permatron developed by Modern Controls Inc. at conditions of 100° F. (37.8° C.) and 100% relative humidity.

Example 1—Screening Study

While not wishing to be bound by theory, it is believed that some nucleating agents improve the WVTR of films made from HDPE resins by altering the crystal structure of the HDPE in the films. Accordingly, a screening study was undertaken to investigate the effect of adding various levels of zinc stearate on the peak melting point ($T_m$) of HDPE blend compositions that also contain zinc glycerolate. Peak melting point is regarded as being an indication of the type/level of nucleation of the crystalline part of the HDPE resin composition. Results are shown in Table 1.

The first comparative experiment (1-C) shows that the $T_m$ of the HDPE blend composition is 132.7° C. and that the addition of 1000-1500 ppm of zinc glycerolate actually decreases $T_m$ slightly to 132.5° C. (see comparative experiments 2-C and 3-C). Inventive compositions are shown in experiments 4 to 7. The combination of zinc stearate and zinc glycerolate is shown to increase $T_m$ to between 132.9 to 133.1° C. The best result shown in Table 1 was observed when using 1500 ppm of zinc glycerolate and 500 ppm of zinc stearate (experiment 6, Tm=133.1). Interestingly, Tm actually decreased somewhat when the zinc stearate level was increased to 1000 ppm (while keeping the zinc glycerolate level at 1500 ppm)—$T_m$ went down to 132.9° C. (although this is still better than the $T_m$ observed using 1500 ppm of zinc glycerolate alone in comparative experiment 3-C). Tm measurements were made using a conventional Differential Scanning calorimetry (DSC) instrument.

It is not particularly important to use a specific DSC instrument, or a specific test method to measure $T_m$ (provided that the same instrument and test method are used for all samples). This is because we believe that relative differences in measured $T_m$ values are helpful for ranking compositions in this screening test.

In Table 1 and the remaining tables, "ZnSt" means zinc stearate and "Zn Gly" means zinc glycerolate.

TABLE 1

| Experiment | Zn Gly (ppm) | ZnSt$_2$ (ppm) | $T_m$ (° C.) |
|---|---|---|---|
| 1-C | | | 132.7 |
| 2-C | 1000 | | 132.5 |
| 3-C | 1500 | | 132.5 |
| 4 | 650 | 350 | 133.0 |
| 5 | 1000 | 350 | 132.9 |
| 6 | 1500 | 500 | 133.1 |
| 7 | 1500 | 1000 | 132.9 |

Example 2

Blown Film Study

The formulations shown in Table 2 were converted into blown films on a conventional blown film line manufactured by Macro Engineering. The extruder was equipped with an annular die having a die gap of 35 mils. The line was operated using the following conditions ("aiming points" are shown):
1) mass flow rate=40 pounds/hour (18.2 kilograms/hr);
2) Blow Up Ratio (BUR)=2/1;
3) Film thickness=1.5 mils;
4) Frost Line Height (FLH)=7 inches (15.4 centimeters). WVTR of the films was measured in accordance with ASTM F 1249-90.

A control film (not shown in Table 2) was prepared on this blown film line using the same HDPE blend composition but without containing either zinc glycerolate or zinc stearate and was observed to have a WVTR of about 0.16 g/100 square inches/day at a film thickness of 1.5 mils.

As shown in Table 2, the addition of 1600 ppm of zinc glycerolate (in the absence of zinc stearate) provided some improvement, with WVTR of the film measured at 0.118 g/100 square inches/day (experiment 2.1-C).

Inventive film 2.2i had a WVTR of 0.0821 g/100 square inches/day, which is a further improvement of 0.035 g—or, alternatively stated, an improvement/reduction of 30.4% in comparison to the control film (2.2 c) that was made without the synergist.

TABLE 2

| Experiment | ZnGly (ppm) | ZnSt2 (ppm) | WVTR (g/100 in$^2$/24 h) | Thickness (mil)$^3$ |
|---|---|---|---|---|
| 2.1-C | 1600 | | 0.118 | 1.55 |
| 2.2-i | 1600 | 500 | 0.0821 | 1.52 |

Example 3

Blown Film Study

A second blown film study was conducted on a higher capacity blown film line manufactured by Gloucester Engineering. The extruder on this line was also equipped with a die having an annular gap of 35 mils. The line was operated using the following conditions ("aiming points" as shown):
1) mass flow rate=100 pounds/hour (45.5 kilograms/hr);
2) Blow Up Ratio (BUR)=2/1;
3) Film thickness=1.5 mils;
4) Frost Line Height (FLH)=14 inches (35.6 centimeters).

Two inventive films were prepared in this study, one with zinc stearate and the other with calcium stearate. The actual film thickness of the films was higher than the aiming points (and higher than the thickness of the films in the first example) and WVTR values were also better—see Table 3.

TABLE 3

| Experiment | ZnGly (ppm) | ZnSt$_2$ (ppm) | CaSt$_2$ (ppm) | WVTR (g/100 in$^2$/24 h) | Thickness (mil)$^3$ |
|---|---|---|---|---|---|
| 3.1 | 1600 | 500 | | 0.067 | 1.63 |
| 3.2 | 1600 | | 500 | 0.077 | 1.60 |

We claim:

1. A barrier film comprising at least one extruded polyethylene layer, wherein said at least one extruded polyethylene layer comprises:
   I) zinc glycerolate;
   II) a high density polyethylene blend composition comprising:
      II-i) from 5 to 60 weight % of at least one high density polyethylene blend component a) having a high melt index, $I_2$; and
      II-ii) from 95 to 40 weight % of at least one high density polyethylene blend component b) having a low melt index, $I_2'$, wherein $I_2'$ is less than $I_2$, wherein:
      a) said zinc glycerolate is present at about 200 to 2000 parts per million based on the weight of said high density polyethylene blend composition;
      b) each of said blend component a) and blend component b) has a density of from 0.950 to 0.975 g/cc;
      c) the melt index, $I_2$, of said high density polyethylene blend composition is from 0.5 to 10 grams/10 minutes; and
      d) the $I_2$ ratio, obtained by dividing the $I_2$ value of said blend component a) by the $I_2'$ value of said blend component b), is greater than 10/1; and
   III) a synergist, wherein said synergist comprises zinc stearate, calcium stearate, or a mixture of zinc stearate and calcium stearate; and wherein said synergist is present at about 30 to about 55 weight % of the weight of said zinc glycerolate.

2. The barrier film of claim 1 wherein said high density polyethylene blend composition comprises from 10 to 40 weight % of said component a) and from 90 to 60 weight % of said component b).

3. The barrier film of claim 1 wherein said high density polyethylene blend composition comprises from 20 to 40 weight % of said component a) and from 80 to 60 weight % of said component b).

4. The barrier film of claim 1 wherein said blend component a) is further characterized by having a molecular weight distribution, Mw/Mn, of from 2 to 4.

5. The barrier film of claim 1 wherein said high density polyethylene blend composition has a density from 0.955 to 0.965 g/cc.

6. The barrier film of claim 1 wherein said high density polyethylene blend composition has a melt index, $I_2$, of from 0.8 to 8 grams/10 minutes.

7. The barrier film of claim 1 wherein said high density blend composition has a molecular weight distribution, Mw/Mn, of from 6 to 12.

8. A process to prepare a barrier film for food packaging, said process comprising the film extrusion of a composition comprising:
   I) zinc glycerolate;
   II) a high density polyethylene blend composition comprising:
      II-i) from 5 to 60 weight % of at least one high density polyethylene blend component a) having a high melt index, $I_2$; and
      II-ii) from 95 to 40 weight % of at least one high density polyethylene blend component b) having a low melt index, $I_2'$, wherein $I_2'$ is less than $I_2$, wherein:
         a) said zinc glycerolate is added at about 200 to 2000 parts per million based on the weight of said high density polyethylene blend composition;
         b) each of said blend component a) and blend component b) has a density of from 0.950 to 0.975 g/cc;
         c) the melt index, $I_2$, of said high density polyethylene blend composition is from 0.5 to 10 grams/10 minutes; and
         d) the $I_2$ ratio, obtained by dividing the $I_2$ value of said blend component a) by the $I_2'$ value of said blend component b), is greater than 10/1; and
   III) a synergist, wherein said synergist comprises zinc stearate, calcium stearate, or a mixture of zinc stearate and calcium stearate; and wherein said synergist is present at about 30 to about 55 weight % of the weight of said zinc glycerolate.

9. The process of claim 8 wherein said high density polyethylene blend composition comprises from 10 to 40 weight % of said component a) and from 90 to 60 weight % of said component b).

10. The process of claim 8 wherein said blend component a) is further characterized by having a molecular weight distribution, Mw/Mn, of from 2 to 4.

11. The process of claim 8 wherein conducted at a blow up ratio of from 1.5/1 to 4/1.

12. The process of claim 8 wherein said barrier film has a water vapor transmission rate that is from 15 to 40% lower than the water vapor transmission rate of a control film that is prepared in the absence of said synergist.

* * * * *